US012766965B2

(12) United States Patent
Nelson et al.

(10) Patent No.: US 12,766,965 B2
(45) Date of Patent: Oct. 20, 2026

(54) SYSTEM AND METHOD FOR OPERATING SUB-SYSTEMS OF BATTERY OPERATED WORK MACHINES

(71) Applicant: Caterpillar Paving Products Inc., Brooklyn Park, MN (US)

(72) Inventors: Ryan James Nelson, Maple Grove, MN (US); Jonathan Adrian Anderson, Maple Grove, MN (US); Brian D Nagel, Ramsey, MN (US); Mathew J. Hedrington, Ham Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 18/967,932

(22) Filed: Dec. 4, 2024

(65) Prior Publication Data

US 2026/0152070 A1 Jun. 4, 2026

(51) Int. Cl.
*B60L 1/00* (2006.01)
*B60T 13/74* (2006.01)

(52) U.S. Cl.
CPC ............ *B60L 1/003* (2013.01); *B60T 13/745* (2013.01)

(58) Field of Classification Search
None
See application file for complete search history.

(56) References Cited

U.S. PATENT DOCUMENTS

| | | | | |
|---|---|---|---|---|
| 5,308,219 | A | 5/1994 | Lee et al. | |
| 5,361,211 | A | 11/1994 | Lee et al. | |
| 6,078,855 | A | 6/2000 | Kinugawa et al. | |
| 2013/0001027 | A1* | 1/2013 | Baehrle-Miller | F16D 65/18 188/106 F |
| 2016/0273196 | A1* | 9/2016 | Funk | E02F 3/432 |
| 2018/0065621 | A1* | 3/2018 | Merkle | B60L 50/15 |
| 2018/0126966 | A1* | 5/2018 | Crum | B60T 13/745 |
| 2021/0062912 | A1* | 3/2021 | Knutson | E02F 9/2253 |
| 2022/0259825 | A1* | 8/2022 | Cliff | B60L 58/14 |
| 2022/0414927 | A1* | 12/2022 | Ricke | G06T 7/579 |
| 2023/0415686 | A1* | 12/2023 | Steinke | F15B 1/26 |
| 2024/0157809 | A1* | 5/2024 | Olson | E02F 9/207 |

FOREIGN PATENT DOCUMENTS

| | | | |
|---|---|---|---|
| JP | 2978750 | B2 | 11/1999 |
| JP | 3113562 | B2 | 12/2000 |
| JP | 4601635 | B2 | 12/2010 |
| JP | 2011149236 | A | 8/2011 |
| JP | 2022090669 | A | 6/2022 |
| JP | 2023031434 | A | 3/2023 |

* cited by examiner

*Primary Examiner* — Truc M Do

(57) ABSTRACT

A method for operating one or more sub-systems of a work machine includes generating, by an input device, a signal; determining, by a controller, a condition based on the signal, the condition indicating an impending issuance of a command for actuating the sub-systems using a hydraulic system; and raising, by the controller, an instruction to activate a hydraulic pump of the hydraulic system in response to the condition such that the hydraulic system is energized prior to actuating the sub-systems.

17 Claims, 4 Drawing Sheets

SYSTEM AND METHOD FOR OPERATING SUB-SYSTEMS OF BATTERY OPERATED WORK MACHINES

TECHNICAL FIELD

The present disclosure relates to work machines, e.g., battery operated work machines, having one or more sub-systems run by a hydraulic system. More particularly, the present disclosure relates to activating a hydraulic pump of the hydraulic system in advance for efficiently operating the sub-systems.

BACKGROUND

Work machines, such as electrically operated work machines or battery operated work machines, are often used at worksites, such as construction sites and/or mining sites, to perform a variety of operations. Performance of such operations typically require one or more sub-systems of the work machines to be utilized. As an example, if a work machine were to include an asphalt paver, a paving operation performable by the asphalt paver may require one or more sub-systems, such as a screed and/or a hopper, of the asphalt paver, to be properly positioned and/or oriented. To attain proper positioning and/or orientation, fluid systems, such as hydraulic systems may be used.

Such hydraulic systems generally include a hydraulic pump that maintains the overall hydraulic system under a requisite fluid pressure to power various operations, such as the ones discussed above. If the hydraulic pump were inactive at a time when a command to perform the operations were initiated and/or issued, as is commonly observed in battery operated work machines, a delay is typically observed for an associated electric motor to turn on, move the hydraulic pump, and build the requisite fluid pressure within the hydraulic system. Such delay results in an operational lag.

Japanese Patent Publication No. JP 4,601,635 B2 relates to an electric construction machine capable of suppressing energy consumption during the wait time when operation of an operation mechanism is stopped.

SUMMARY

In one aspect, the present disclosure discloses a method for operating one or more sub-systems of a work machine. The method includes generating, by an input device, a signal. Further, the method includes determining, by a controller, a condition based on the signal, the condition indicating an impending issuance of a command for actuating the sub-systems using a hydraulic system. The method also includes raising, by the controller, an instruction to activate a hydraulic pump by powering on an electric motor of the hydraulic system in response to the condition. In so doing, the hydraulic system is energized prior to actuating the sub-systems.

In another aspect, the disclosure relates to a system for operating one or more sub-systems of a work machine. The system including an input device and a controller. The input device is configured to generate a signal. The controller is communicatively coupled with the input device. The controller is configured to determine a condition based on the signal. The condition indicates an impending issuance of a command for actuating the sub-systems using a hydraulic system. Further, the controller is configured to raise an instruction to activate a hydraulic pump by powering on an electric motor of the hydraulic system in response to the condition such that the hydraulic system is energized prior to actuating the sub-systems.

In yet another aspect, the disclosure is directed to a work machine. The work machine includes one or more sub-systems to perform work and a hydraulic system to actuate the sub-systems. The hydraulic system includes a hydraulic pump. Further, the work machine includes a system for operating the sub-systems. The system includes an input device and a controller. The input device is configured to generate a signal. The controller is communicatively coupled with the input device. The controller is configured to determine a condition based on the signal. The condition indicates an impending issuance of a command for actuating the sub-systems using the hydraulic system. Also, the controller is configured to raise an instruction to activate the hydraulic pump by powering on an electric motor of the hydraulic system in response to the condition such that the hydraulic system is energized prior to actuating the sub-systems.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201, could refer to one or more comparable components used in the same or different depicted embodiments.

Figure 1:
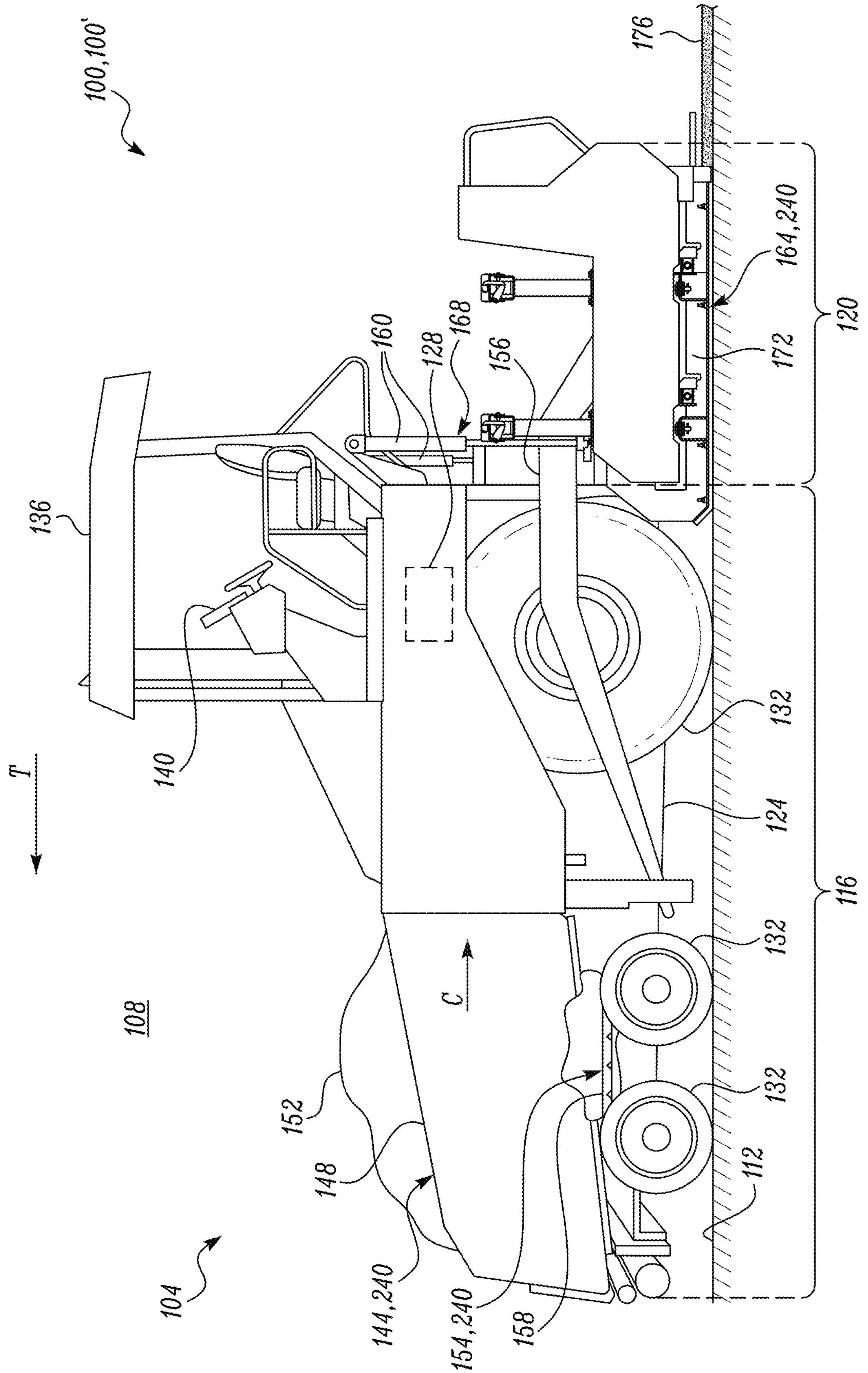
FIG. 1 is side view of an exemplary work machine having sub-systems actuatable by one or more hydraulic systems, in accordance with an embodiment of the present disclosure.

Referring to FIG. 1, an exemplary work machine, i.e., a work machine 100, is illustrated. The work machine 100 may include a paving machine 104, although aspects of the present disclosure may be suitably applied to various other work machines, such as graders, scrapers, excavators, loaders, dozers, dump trucks, and the like work machines, and such applications may be contemplatable by those skilled in the art. Aspect of the present disclosure may be applicable to both stationary and mobile work machines. Several aspects of the present disclosure are described in relation to the paving machine 104. However, references to the paving machine 104 are exemplary. Moreover, the paving machine 104 may be interchangeably referred to as the work machine 100 to indicate that said aspects are also applicable to work machines other than the paving machine 104, such as those that are noted above.

The work machine 100 may be applied at a worksite 108, such as a road construction site, a pavement construction site, etc., to perform a paving operation over a work surface 112 defined at those sites. The work machine 100 may include a tractor portion 116 and a screed portion 120.

The tractor portion 116 may include, among other components and systems, a machine frame 124, a power source 128, a number of traction devices 132 (e.g., tracks and/or wheels) to support and propel the machine frame 124 (and thus the work machine 100) over the work surface 112, as the traction devices 132 may receive power from the power source 128. The power source 128 may be supported on the machine frame 124, and, although not limited, may include an electrical power source, such as a rechargeable battery (not shown). Therefore, in some embodiments, the work machine 100 may be a battery operated work machine 100' and functions of the work machine 100 may be powered by way of electrical power. Apart from powering the traction devices 132 for machine propulsion, the power source 128 may be applied to power various sub-systems of the work machine 100. One or more such sub-systems are described further below in the present description.

Further, the tractor portion 116 may include an operator station 136. The operator station 136 may be supported over the machine frame 124, as shown. The operator station 136 may facilitate stationing of one of more operators therein, enabling operator access and control over one or more functions of the work machine 100. For example, the operator station 136 may house one or more operator control units (see units 140) and/or multiple control panels that may be accessed by operators for controlling several functions of the work machine 100. In one example, the units 140 and/or the operator station, as a whole, may be stationed elsewhere, e.g., remotely to the work machine 100, such that the functions of the work machine 100 may be initiated and/or controlled remotely from the work machine 100.

The tractor portion 116 may include various sub-systems such as a hopper system 144, having a hopper 148, along with a hopper actuation system (not shown). As an example, the hopper system 144 may be suitably actuated and/or manipulated by the hopper actuation system to hold and/or guide a paving material 152, held within a cavity of the hopper 148, towards the screed portion 120. To this end, the hopper actuation system may include one or more actuators (not shown), which may be coupled between the hopper 148 and the machine frame 124 and which may be suitably controlled to actuate and/or manipulate the hopper system 144. The actuators of the hopper actuation system may include hydraulic actuators, and which may function in a manner known to those skilled in the art. Paving material 152 may include such a hot asphalt mixture, and the like materials, now known or in the future developed.

Among other sub-systems of the tractor portion 116, the tractor portion 116 may include a conveyor system 154, having a conveyor 158, along with a conveyor actuation system (not shown). As an example, the conveyor system 154 may include belts, chains, and/or augers (which may collectively form the conveyor 158). The conveyor 158 may be suitably moved by the conveyor actuation system to transport the paving material 152 from the hopper system 144 towards the screed portion 120 (see direction, C). To this end, the conveyor actuation system may include one or more actuators (not shown), which may be suitably controlled to actuate and/or move the conveyor system 154 to enable the aforenoted conveying action. The actuators of the conveyor actuation system may include fluid actuators or hydraulic actuators, and which may function in a manner known to those skilled in the art.

The screed portion 120 may be towed by the tractor portion 116 along an exemplary operational direction (see direction, T) during the paving operation of the work machine 100. Effectively, the screed portion 120 may trail the tractor portion 116 and may face rearwards during machine travel and/or the paving operations, while the tractor portion 116 may lead the screed portion 120 and may face forward during machine travel and/or the paving operations. During machine movement along direction, T, the tractor portion 116 may transmit tractive forces to the screed portion 120, e.g., by way of tow arms 156 (only one is viewable in the orientation of the work machine 100 provided in FIG. 1) such that the screed portion 120 may be towed along a movement of the machine frame 124 or the tractor portion 116 along direction, T. One or more actuators 160 may be connected between machine frame 124 and the tow arms 156 to move or articulate the screed portion 120 with respect to the tractor portion 116 and/or the machine frame 124. It is contemplated, however, that, in some cases, the screed portion 120 may be towed by another machine (not shown), as and when desired. In such cases, the tractor portion 116 may be omitted from the work machine 100.

The screed portion 120 may include a screed system 164 and a screed actuation system 168 to control the screed system 164. As an example, the screed system 164 may include a number of screed segments 172. The screed segments 172 may be movable with respect to each other. Also, the screed segments 172 (and/or the screed system 164) may receive the paving material 152 thereunder from the conveyor system 154. Further, the screed actuation system 168 may include the actuators 160 to suitably move the screed system 164 such that the screed system 164 can grade, level, and shape the paving material 152 received thereunder. The actuators 160 may be hydraulic actuators. Further, screed movement may include a tilting, a panning, or the like movements, of the screed segments 172.

As an example, a lifting of one or more of the screed segments 172 to attain any such movement may involve an actuation of the actuators 160 that are connected between the machine frame 124 and the tow arms 156. In some embodiments, some actuators (e.g., similar to the actuators 160) (not shown) of the screed actuation system 168 may also move the screed segments 172 with respect to each other. By way of such movement, the screed system 164 may convert a volume of the paving material 152, inflowing from the hopper system 144, into a layer, e.g., a road mat 176, over the work surface 112, defining a desired thickness and width.

In effect, the screed actuation system 168 may be applied to control the screed system 164, e.g., to raise, lower, shift, expand, and/or tilt the screed system 164 and/or the screed segments 172 of the screed system 164, relative to the tractor portion 116 and/or to the machine frame 124, to form the road mat 176. Such control may be performed by one or more operators having access to the units 140 housed within the operator station 136. It is also contemplated that the screed system 164 may generally be free floating, if desired, but may be suitably raised or lowered for paving operations.

The terms 'forward' and 'rearward', and similar terms, as have been used herein, are in relation to an exemplary forward direction of travel of the work machine 100, as represented by arrow, T, in FIG. 1, in which the work machine 100 may generally travel to perform the paving operation. Also, said forward direction of travel, T, of the work machine 100 is defined from the screed portion 120 towards the tractor portion 116 of the work machine 100.

The systems, e.g., the screed system 164, the hopper system 144, and the conveyor system 154, may form part of the work machine's sub-systems, and, effectively, functions of such sub-systems may be actuated correspondingly by their actuation systems (e.g., the screed system 164 may be actuated by the screed actuation system 168). Each of the actuation systems, such as the screed actuation system 168, along with many such actuation systems of the work machine 100, may be fluid systems and/or hydraulic systems. Such hydraulic systems, apart from including the aforementioned hydraulic actuators, may also include a hydraulic pump, a motor to run the hydraulic pump, fluid circuits to supply fluid pressure from the hydraulic pump, and the like components, such as valves, as may be commonly found in conventional hydraulic systems for operation. The number of sub-systems for the work machine 100 discussed above need not be considered to be exhaustive. Therefore, the work machine 100 may include several additional such sub-systems, which may use corresponding fluid systems and/or hydraulic systems to actuate such sub-systems, with such sub-systems being either now known or in the future developed.

Figure 2:
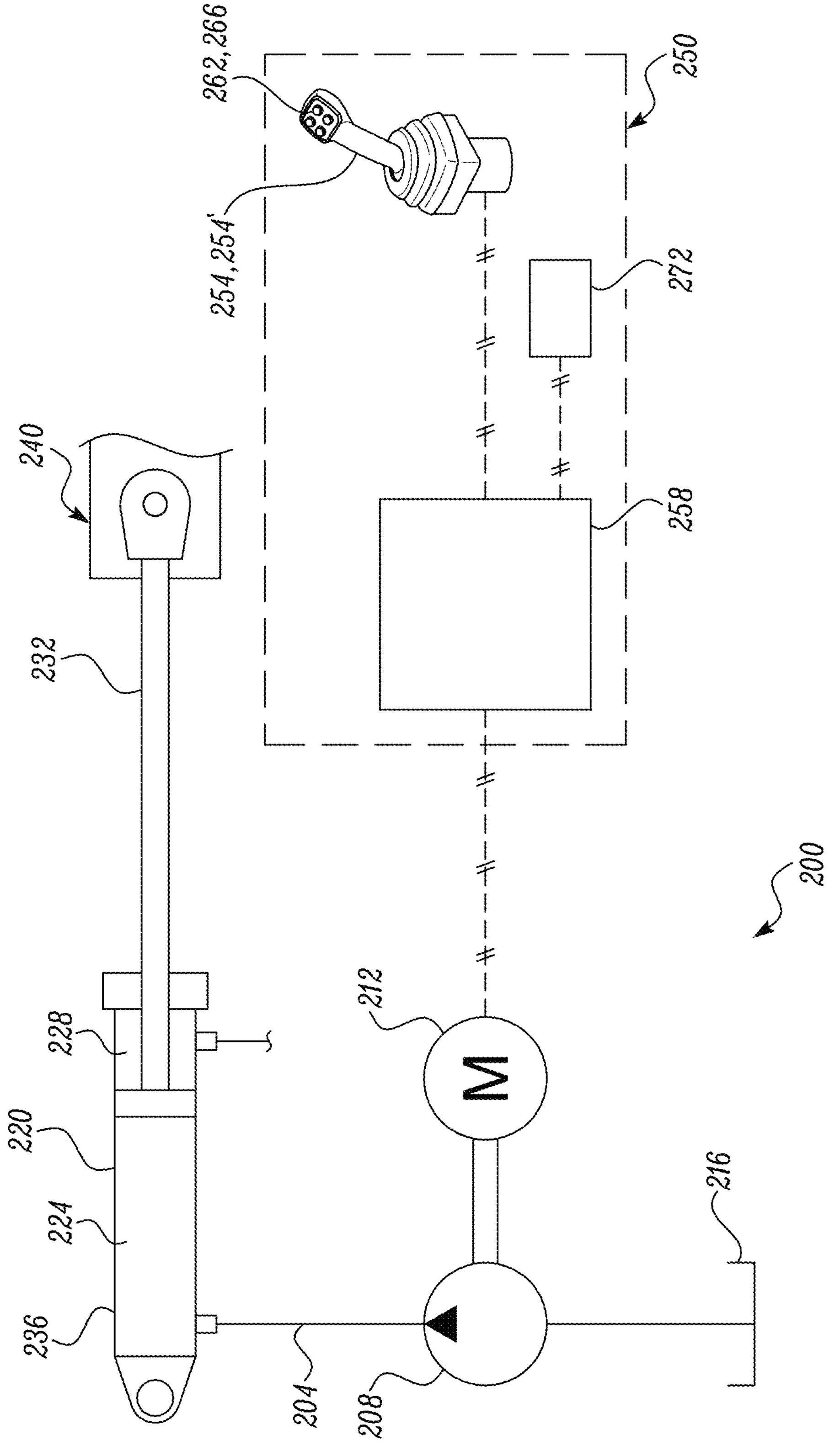
FIGS. 2 and 3 are exemplary schematic views of various embodiments of a system configured to operate the sub-systems by way of the hydraulic systems, in accordance with an embodiment of the present disclosure.
Figure 3:
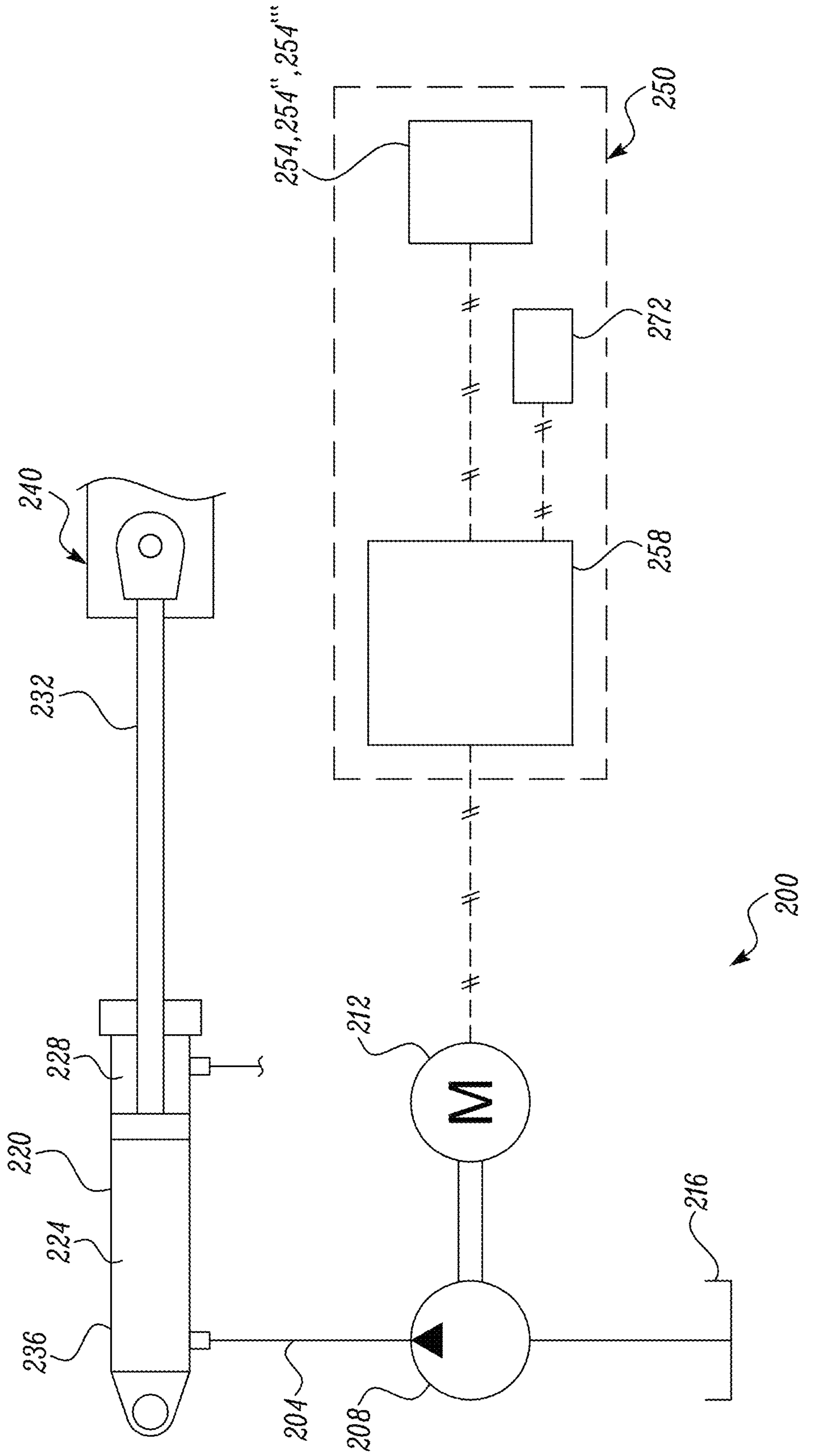

Referring to FIGS. 2 and 3, an exemplary hydraulic system, i.e., a hydraulic system 200, of the work machine 100 is described. The hydraulic system 200 may represent any of the actuation systems described above, such as the screed actuation system 168. The hydraulic system 200 may be configured to serve (e.g., actuate) any one or more sub-systems of the work machine, e.g., the screed system 164, such that said sub-system can perform its associated work. As shown, the hydraulic system 200 includes a fluid circuit 204, a hydraulic pump 208 which may be activated to provide fluid or hydraulic pressure into the fluid circuit 204, an electric motor 212 (e.g., powerable by a battery of the work machine 100) to activate the hydraulic pump 208, and a reservoir 216 to hold a hydraulic fluid. The hydraulic system 200 may also include one or more actuators (e.g., see actuator 220) which may provide actuation power to the corresponding sub-system of the work machine 100.

As an example, if the sub-system were the screed system 164, the hydraulic system 200 may be the screed actuation system 168, and the actuator 220 of the hydraulic system 200 may include and/or be representative of one or more of the actuators 160 of the screed actuation system 168, described above. The hydraulic system 200 may include various other components and/or devices known to those skilled in the art, but which are not exhaustively discussed herein for the sake of brevity. For ease of reference and understanding, the sub-system actuatable by the hydraulic system 200 may be referred to as sub-system 240.

For the purposes of the present description, the actuator 220 may represent a single actuator and/or multiple actuators. Although not limited, the actuator 220 may be a hydraulic actuator including a cylinder-rod arrangement, defining a head end chamber 224 and a rod end chamber 228. During operations, one of the head end chamber 224 and the rod end chamber 228 may receive fluid pressure from the hydraulic pump 208 via one portion of the fluid circuit 204 and the other of the head end chamber 224 and the rod end chamber 228 may release fluid pressure, e.g., to the reservoir 216, via another portion of the fluid circuit 204. In so doing, a rod 232 associated with the cylinder-rod arrangement may be moved back and forth with respect to a cylinder 236 associated with the cylinder-rod arrangement. A relative motion between the rod 232 and the cylinder 236 may result in a desirable movement between various parts of the sub-system 240.

As an example, if the sub-system 240 were the screed system 164, the actuator 220 may correspond to each of the actuators 160 connected between the machine frame 124 and the screed system 164. In such a case, an influx of fluid into the head end chamber 224 of the actuators 160 (and a simultaneous efflux of fluid from the rod end chamber 228 of the actuators 160) may cause the actuators 160 to move to an extended state and the screed system 164 to be lowered with respect to the machine frame 124. Conversely, an influx of fluid into the rod end chamber 228 of the actuators 160 (and a simultaneous efflux of fluid from the head end chamber 224 of the actuators 160) may cause the actuators 160 to move to a retracted state and the screed system 164 to be raised with respect to the machine frame 124.

According to some aspects of the present disclosure, the work machine 100 includes a system 250 for operating the sub-system 240. The system 250 serves to activate the hydraulic pump 208 of the hydraulic system 200 (e.g., by powering on the electric motor 212 of the hydraulic system 200) in advance and/or prior to an actual start of actuation of the sub-system 240. In so doing, the hydraulic pump 208 is pre-started and/or powered well before an actual actuation of the sub-system 240, in turn avoiding a delay and/or an operational lag when actuating the sub-system 240. The system 250 includes an input device 254 and a controller 258.

The input device 254 may be associated with the work machine 100 and may include an electrical and/or an electronic component which may be configured to generate a signal. The input device 254 may be positioned within the work machine 100, although, in some embodiments, the input device 254 may be situated outside the work machine 100. According to an aspect of the present disclosure, the signal generated by the input device 254 may be useable by the controller 258 to power on the electric motor 212 and activate the hydraulic pump 208 in advance and/or prior to the actuation of the sub-system 240 such that the hydraulic pump 208 gains operational momentum and/or is up to a minimum speed to energize the hydraulic system 200 by the time a command may be issued to actuate the sub-system 240. In some embodiments, the input device 254 may correspond to an operator joystick (or simply a joystick 254') within the operator station 136. The joystick 254' may be applied to propel the work machine 100—e.g., a manipulation of the joystick 254' may result in a movement of the work machine 100 with respect to the work surface 112. In some embodiments, the input device 254 may correspond to a sensor 254" (see FIG. 3) that may determine a proximity of another machine with respect to the work machine 100. In some embodiments, the input device 254 may correspond to a braking system 254'" (see FIG. 3) of the work machine 100.

In case the input device 254 includes the joystick 254', the joystick 254' may include one or more input interfaces—for example, an input interface 262. The input interface 262 may be configured to be switched between an on-position and an off-position. In the on-position, a movement of the work machine 100 upon a manipulation of the joystick 254' may be enabled. In the off-position, the movement of the work machine 100 upon the manipulation of the joystick 254' may be disabled. In other words, a manipulation of the joystick 254' may not result in the movement of the work machine 100 unless the input interface 262 were switched to the on-position. In some embodiments, the input interface 262 may include a press button switch 266, depressing which may correspond to the on-position of the input interface 262, and releasing which may correspond to the off-position of the input interface 262. Although not limited, the input interface 262 may be switchable to each of the on-position and the off-position by an operator of the work machine 100. According to an aspect of the present disclosure, the signal may be generated by the input device 254 (e.g., the joystick 254') when the input interface 262 is in the on-position.

In case the input device 254 includes the sensor 254" (see FIG. 3), the sensor 254" may sense a distance, at any given point in time, of the work machine 100 with respect to another work machine—for discussions herein, the work machine 100 may be referred to as a first work machine 100 and the other work machine, up to which the distance of the first work machine 100 may be sensed, may be referred to as a second work machine. The second work machine may include a dump truck which may be employed to supply the paving material into the hopper of the hopper system—the second work machine is not shown. In this regard, a relatively close distance detected between the second work machine and the first work machine 100 may indicate that an influx of the paving material 152 into the hopper 148 of the first work machine 100 is in progress, while a relatively large distance (e.g., detected after the detection of the relatively close proximity) of the second work machine to the first work machine 100 may indicate that the second work machine has moved away from the first work machine 100 after completing transfer of the paving material 152 into the first work machine 100, and, in so doing, an actuation of the sub-system 240 for performing related work is imminent and/or impending.

The distance between the first work machine 100 and the second work machine may be sensed at multiple instances. Therefore, multiple distances may be sensed by the sensor 254" over a period. Corresponding to each distance sensed, the sensor 254" may generate a corresponding signal. For the purposes of the present disclosure, a first distance and a second distance between the first work machine 100 and the second work machine will be referred to in the discussions below. Although not limited, the sensor 254" may be a proximity sensor. Other sensors and/or sensing systems configured to detect distances between work machines may be applied as well.

In case the input device 254 includes the braking system 254''', the braking system 254''', may be used to stop or halt a movement of the work machine 100 (e.g., if the work machine 100 is a mobile work machine such as the paving machine 104). In this regard, the braking system 254''' may be moved between an engaged state and a disengaged state. In the engaged state, the work machine 100 may be retained in a stationary state, and, in the disengaged state, the work machine 100 may be released from the stationary state to be in a mobile state. Corresponding to the engaged state, the braking system 254''' may generate an engaged signal, and corresponding to the disengaged state, the braking system 254''' may generate a disengaged signal.

A scenario where the input device 254 includes the sensor 254" may be referred to as first scenario; a scenario where the input device 254 includes the braking system 254''' may be referred to as second scenario; and a scenario where the input device 254 includes the joystick 254' may be referred to as a third scenario. Moreover, input devices, such as the joystick 254', the sensor 254", and the braking system 254''', as described above, are purely exemplary, and a variety of other input devices may be applied and/or used for signal generation. Effectively, those skilled in the art may contemplate, additional examples of the input device 254 (and/or devices and system that can generate signals such as the ones discussed above) and a corresponding scenario, based on the present disclosure. Given that the input device 254 in one or more scenarios may generate one or more signals, the term 'signal(s)' shall be used in several places of the present disclosure. It will be appreciated that such usage is intended to cover both a single signal and multiple signals. Wherever required, specific terms such as 'signal' and 'signals' shall also be used.

The controller 258 may be communicatively coupled with the input device 254. The controller 258 may be configured to receive the signal(s) from the input device 254, e.g., as and when the signal(s) is/are generated by the input device 254 or with minimum delay. Further, in response to the receipt of the signals(s) the controller 258 may be configured to extract a set of instructions from a memory 272. Moreover, the controller 258 may be configured to run the set of instructions. Based on running the set of instructions and/or based on the signal(s) received from the input device 254, the controller 258 may determine a condition. The condition may indicate an impending issuance of a command for actuating the sub-system 240 using the hydraulic system 200. A manner in which the condition may be determined corresponding to signal(s) from the exemplary input devices described above shall be discussed later in the present disclosure.

Further, the controller 258 may be configured to raise an instruction to power on the electric motor 212 and activate the hydraulic pump 208 of the hydraulic system 200 in response to the condition such that the hydraulic system 200 is energized prior to actuating the sub-system 240. In so doing, the controller 258 helps activate the hydraulic pump 208 and/or energize the hydraulic system 200 in advance (e.g., by powering on the electric motor 212 and by shifting the hydraulic pump 208 to an activated state in response to the instruction), in anticipation of the actuation of the sub-system 240. The condition may be referred to as a 'start pump condition'.

The controller 258 may correspond to one or more controllers which may be communicably coupled to the work machine's main control module (not shown), such as a safety module or a dynamics module, or may be configured as a stand-alone entity. Optionally, the controller 258 may be integral to or be one and the same as the work machine's main control module. In some embodiments, one or more controlling portions of the controller 258 may be within the work machine 100, while the other controlling portions may be situated outside the work machine 100, i.e., remotely to the work machine 100. In some embodiments, the controller 258 may be positioned entirely outside the work machine 100, e.g., remotely from the work machine 100.

Further, the controller 258 may include a microprocessor-based device, or the controller 258 may be envisioned as an application-specific integrated circuit, or other logic devices, which provide controller functionality, and such devices or systems being known to those with ordinary skill in the art. In some embodiments, the set of instructions may be provided in any computer readable media, for example, any non-transitory computer readable media, and that when executed by the controller 258 may result in one or more of the functions of the controller 258, as has been described herein.

In one example, it is possible for the controller 258 to include or be representative of one or more controllers or control systems having separate or integrally configured processing units to process a variety of data, such as input or commands or signals incoming from the input device 254. In some embodiments, a transmission of data between the input device 254 and the controller 258 and/or between the controller 258 and various other systems or devices, such as the units 140, the electric motor 212, etc., may be facilitated wirelessly or through a standardized CAN bus protocol. Although not limited, the controller 258 may be optimally suited for accommodation within certain panels or portions, such as machine panels or portions, from where the controller 258 may remain accessible for ease of use, service, calibration, repairs, and replacements.

Processing units or any one or more processors associated with the controller 258, to convert or process various input, command, signals, etc., may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor now known or in the future developed.

Examples of the memory 272 may include a hard disk drive (HDD), and a secure digital (SD) card. Further, the memory 272 may include non-volatile/volatile memory units such as a random-access memory (RAM)/a read only memory (ROM), which may include associated input and output buses. The memory 272 may be configured to store various other instruction sets for various other functions of the work machine 100, along with the set of instruction, described above. Although not limited, the memory 272 may be configured within and may form part of the controller 258, in some cases.

INDUSTRIAL APPLICABILITY

Figure 4:
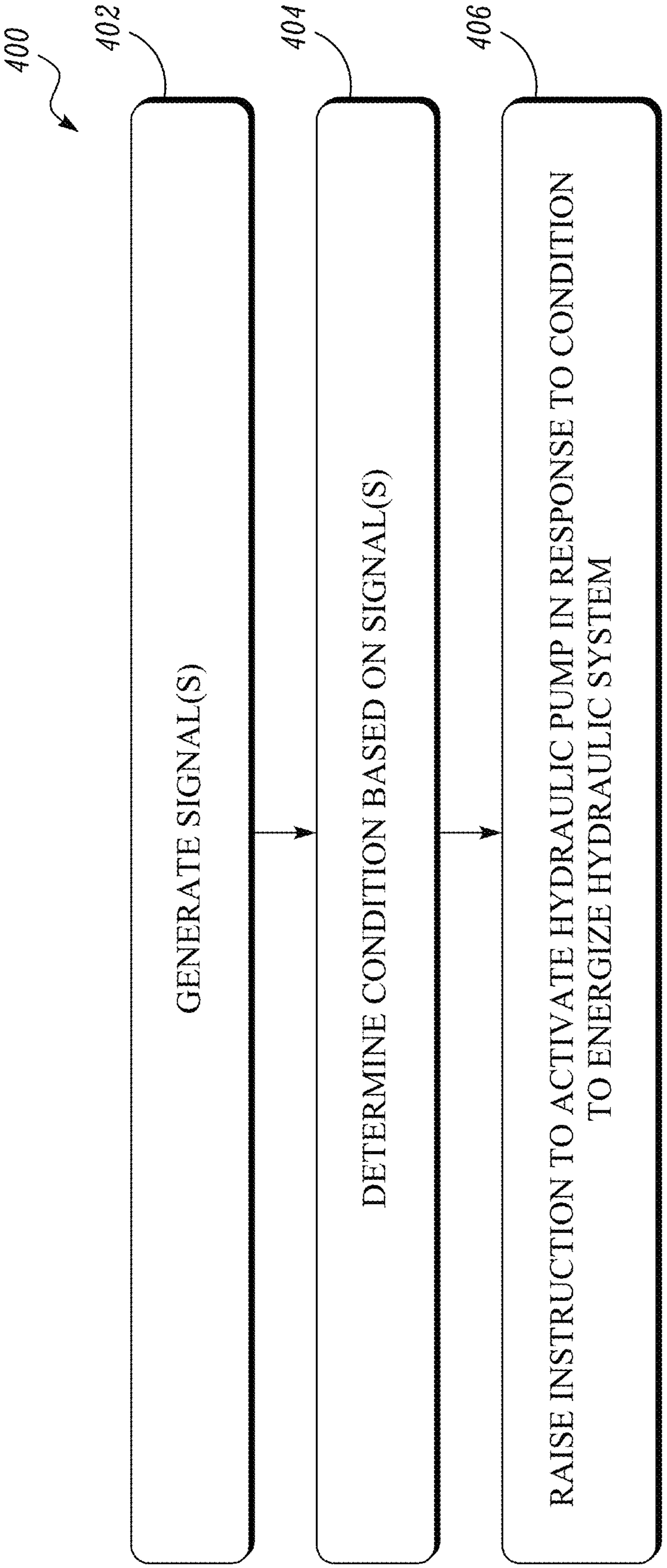
FIG. 4 is a flowchart illustrating an exemplary method for operating one or more sub-systems of the work machine, in accordance with an embodiment of the present disclosure.

Referring to FIG. 4, and with continued reference to FIGS. 2 and 3, an exemplary method for operating the sub-system 240 is described. Said method is described by way of a flowchart 400 illustrated in FIG. 4. At block 402 of the flowchart 400, the input device 254 may generate the signal(s). A manner in which the signal(s) (e.g., the first signal, the second signal, the third signal, and/or the fourth signal) is/are generated is not iterated here again for sake of brevity. Once the signal(s) is/are generated, the controller 258 may receive the signal(s) from the input device 254, e.g., as and when the signal(s) is/are generated by the input device 254 and/or with minimum delay. In response to the receipt of the signals(s) the controller 258 may extract the set of instructions from the memory 272 and may run the set of instructions.

Based on running the set of instructions and/or based on the signal(s) received from the input device 254, at block 404 of the flowchart 400, the controller 258 may determine the start pump condition. The start pump condition may indicate the impending issuance of the command for actuating the sub-system 240 using the hydraulic system 200. Further, at block 406 of the flowchart 400, the controller 258 may raise an instruction to activate the hydraulic pump 208 (e.g., by powering on the electric motor 212) of the hydraulic system 200 in response to the start pump condition such that the hydraulic system 200 is energized prior to actuating the sub-system 240. Detailed functioning related to the first scenario, second scenario, and the third scenario, is set out further below.

During operations, as part of the first scenario, the second work machine (which may be a dump truck) may approach the first work machine 100 (which may be a paving machine 104) and may position or station itself against the first work machine 100 in close proximity such that paving material 152 from the second work machine may be transferred into the first work machine 100. Once the paving material 152 is transferred into the first work machine 100, the second work machine may move away from the first work machine 100. The sensor 254", being the input device 254 in this first scenario, may sense a distance of the second work machine from the first work machine 100 at each instance—i.e., when the second work machine is in close proximity to the first work machine, e.g., to dump the paving material 152 into the first work machine 100, thus sensing the first distance; and when the second work machine is away from the first work machine 100, thus sensing the second distance. The sensor 254" may also generate a first signal corresponding to the first distance and a second signal corresponding to the second distance.

The controller 258 may receive the first signal and the second signal from the sensor 254". In some embodiments, once such signal(s) are generated, a transmission of said signal(s) may occur periodically or continuously or according to any predetermined pattern defined for signal transmission. In response to the receipt of the first signal and the second signal by the controller 258, the controller 258 may extract the set of instructions from the memory 272 to run the set of instructions. The controller 258 may then process both the first signal and the second signal. By way of processing the first signal and the second signal, the controller 258 may compare the second signal with the first signal and may accordingly determine whether a difference between the second distance and the first distance has increased beyond a threshold difference (e.g., this may happen as the second work machine may move away from the first work machine 100 after a transfer of the paving material 152 is complete). If the difference is determined by the controller 258 to have increased beyond the threshold difference, the controller 258 may determine the ‘start pump condition’.

During operations, as part of the second scenario, when the work machine 100 is in a stationary state, the braking system 254''' may be in an engaged state so as to keep the work machine 100 non-mobile, e.g., with respect to the work surface 112 or any ground surface underlying the work machine 100. In the engaged state, the braking system 254''' may generate an engaged signal and the same may be delivered to the controller 258, e.g., periodically. As the work machine 100 may need to be moved (e.g., for the start of an operation such as the paving operation described above), the operator may move the braking system 254''' from the engaged state to the disengaged state so as to release the work machine 100 from the stationary state to cause the work machine 100 to be in the mobile state.

In the disengaged state, the braking system 254''' may generate the disengaged signal and the same may be delivered to the controller 258, e.g., immediately or with minimum time delay or as soon as the braking system 254''' is moved to the disengaged state from the engaged state. In some embodiments, once such a signal is generated, a transmission of said signal may occur periodically or continuously or according to any predetermined pattern defined for signal transmission. In that manner, the controller 258 may detect the disengaged state of the braking system 254''' in succession (e.g., immediately in succession) to the engaged state of the braking system 254'''. The controller 258 may detect such movement of the braking system 254''' as a third signal and may accordingly determine the ‘start pump condition’.

During operations, as part of the third scenario, an operator may access the input device 254, e.g., the joystick 254', to move the work machine 100 by manipulating the joystick 254'. For this purpose, the operator may gain access to the input interface 262 on the joystick 254' and may switch the input interface 262 to the on-position (e.g., from the off-position or from any intermediary-position defined in between the on-position and the off-position). As soon as such switching may occur, the input device 254 (and/or the joystick 254') may generate a signal. Upon a generation of the signal, the input device 254 may transmit the signal, e.g., with minimum time delay, to the controller 258. In some embodiments, once such a signal is generated, a transmission of said signal may occur periodically or continuously or according to any predetermined pattern defined for signal transmission. For the purposes of the present disclosure, the signal generated by the input device 254 upon a switching of the input interface 262 to the on-position may be referred to as a fourth signal.

The controller 258 may receive the fourth signal and may retrieve the set of instructions from the memory 272. Further, the controller 258 may run the set of instructions. By way of the running of the set of instructions, if the controller 258 detects that the on-position was switched to and/or attained in succession to the off-position, the controller 258 may determine the 'start pump condition'. In some embodiments, if the controller 258 detects that the on-position was switched to and/or attained in succession to the intermediary-position, the controller 258 may still determine the 'start pump condition'.

Effectively, the controller 258 may determine the 'start pump condition' based on the signal(s) described above—with said condition indicating an impending issuance of a command for actuating the sub-system 240 (e.g., the screed system 164) using the hydraulic system 200 (e.g., the screed actuation system 168). In response to determining the 'start pump condition', the controller 258 may raise the instruction to activate the hydraulic pump 208 of the hydraulic system 200 such that the hydraulic system 200 is energized prior to an actual actuation of the sub-system 240 (e.g., the screed system 164). In some embodiments, apart from raising the instruction, the controller 258 may also shift the hydraulic pump 208 to an activated state in response to the instruction. Such shifting may be possible when the hydraulic pump 208 is in a deactivated state prior to raising the instruction.

In some embodiments, the instruction may be a first instruction and the controller 258 may raise another instruction or a second instruction in subsequence or pursuance to the first instruction. The controller 258 may raise the second instruction to deactivate the hydraulic pump 208 after a lapse of a predetermined period starting from the raising of the first instruction and upon a non-issuance of the command for actuating the sub-system 240 within the predetermined period. In some embodiments, the controller 258 may also shift the hydraulic pump 208 to the deactivated state in response to the second instruction, e.g., by powering off the electric motor 212. Conversely, if the command is issued within the predetermined period, the controller 258 may detect the issuance of said command within the predetermined period. In such a case, the controller 258 may override the second instruction upon the issuance of the command within the predetermined period to keep the hydraulic pump 208 activated (e.g., by keeping the electric motor 212 powered on) for a continued actuation of the sub-system 240.

Without pre-starting the electric motor 212 and the hydraulic pump 208, actuations and subsequent operations of the sub-system 240 may face operational delays, in turn affecting operational accuracy and/or a quality of work output. The system 250, as described herein, utilizes machine based signals (e.g., any one or more of the first signal, second signal, third signal, fourth signal) to anticipate or determine an impending issuance of a command to actuate the sub-system 240 and accordingly may power on the electric motor 212 to activate the hydraulic pump 208 well in advance to an actual actuation command issued for starting the sub-system 240. Effectively, the signal(s) generated from the input device 254 helps pre-start the electric motor 212 and thus the hydraulic pump 208. In so doing, the system 250 helps mitigate or eliminate a delay or lag associated with a starting of the electric motor 212 and/or the sub-system 240, e.g., a hydraulically powered sub-system, as is commonly observed in battery operated work machines. The system 250 thus enhances operational accuracy, along with helping maintain a quality of the work output.

The terms 'third signal' and 'fourth signal' when viewed in relation to the 'first signal' and 'second signal', are not intended to indicate any chronology of signal generation or signal usage, rather they are simply used to describe the scenarios they are correspondingly applied in. These scenarios may occur independently of each other, although it is possible that one scenario may work in conjunction with one or more other scenarios in the same machine and about the same time. As an example, a start pump condition determined according to one scenario may serve as a confirmation and/or a verification for a start pump condition determined according to another scenario in the same machine.

Additionally, and as described above, references to the paving machine 104 and its various sub-systems (e.g., sub-system 240) are purely exemplary. Concepts discussed for the paving machine 104 and its sub-systems (e.g., sub-system 240) may be suitably extended and applied to a myriad of other work machines by those skilled in the art. All such extensions and applications fall within the ambit of the claimed subject matter disclosed herein.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the disclosure, especially in the context of the following claims, are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method or system of the present disclosure without departing from the scope of the disclosure. Other embodiments will be apparent to those skilled in the art from consideration of the specification and practice of the method or system disclosed herein. It is intended that the specification and examples be considered as examples only, with a true scope of the disclosure being indicated by the following claims and their equivalent.

What is claimed is:

1. A method for operating one or more sub-systems of a first work machine, the method comprising:

sensing, by a sensor of an input device, a first distance and a second distance of a second work machine from the first work machine, wherein the second distance is sensed pursuant to the sensing of the first distance;

generating, by the input device, one or more signals including a first signal and a second signal;

comparing, by a controller, the second signal with the first signal to determine a difference between the second distance and the first distance to have increased beyond a threshold difference to determine a condition;

determining, by the controller, the condition based on the one or more signals, the condition indicating an impending issuance of a command for actuating the one or more sub-systems using a hydraulic system; and raising, by the controller, an instruction to activate a hydraulic pump by powering on an electric motor of the hydraulic system in response to the condition such that the hydraulic system is energized prior to actuating the one or more sub-systems.

2. The method of claim 1, wherein the instruction is a first instruction, the method including:

raising, by the controller, a second instruction in pursuance to the first instruction to deactivate the hydraulic pump after a lapse of a predetermined period starting from the raising of the first instruction and upon a non-issuance of the command within the predetermined period.

3. The method of claim 2 further including:

detecting, by the controller, an issuance of the command within the predetermined period; and overriding, by the controller, the second instruction upon the issuance of the command within the predetermined period to keep the hydraulic pump activated for actuating the one or more sub-systems.

4. The method of claim 1, wherein, the work machine is a battery operated work machine, and prior to raising the instruction, the hydraulic pump is in a deactivated state, the method further including:

shifting, by the controller, the hydraulic pump to an activated state in response to the instruction.

5. The method of claim 1, wherein, the input device includes a braking system configured to be moved between an engaged state and a disengaged state, in the engaged state, the work machine is retained in a stationary state, and in the disengaged state, the work machine is released from the stationary state to be in a mobile state, the method including:

detecting, by the controller, the disengaged state of the braking system in succession to the engaged state of the braking system as a third signal of the one or more signals to determine the condition.

6. The method of claim 1, wherein, the input device includes an operator joystick having an input interface, the input interface configured to be switched between an on-position and an off-position, in the on-position, a movement of the work machine upon a manipulation of the operator joystick is enabled and a fourth signal of the one or more signals is generated by the input device, and in the off-position, the movement of the work machine upon the manipulation of the operator joystick is disabled, the method including:

detecting, by the controller, the fourth signal or the on-position of the input interface in succession to the off-position of the input interface to determine the condition.

7. A system for operating one or more sub-systems of a first work machine, the system comprising:

an input device configured to generate one or more signals, the input device including a sensor configured to:

sense a first distance and a second distance of the second work machine with respect to the first work machine; and generate a first signal and a second signal of the one or more signals, wherein the second distance is sensed pursuant to a sensing of the first distance; and a controller communicatively coupled with the input device, the controller configured to:

compare the second signal with the first signal to determine a difference between the second distance and the first distance to have increased beyond a threshold difference to determine a condition;

determine the condition based on the one or more signals, the condition indicating an impending issuance of a command for actuating the one or more sub-systems using a hydraulic system; and raise an instruction to activate a hydraulic pump by powering on an electric motor of the hydraulic system in response to the condition such that the hydraulic system is energized prior to actuating the one or more sub-systems.

8. The system of claim 7, wherein the instruction is a first instruction, the controller configured to:

raise a second instruction in pursuance to the first instruction to deactivate the hydraulic pump after a lapse of a predetermined period starting from the raising of the first instruction and upon a non-issuance of the command within the predetermined period.

9. The system of claim 8, wherein the controller is configured to:

detect an issuance of the command within the predetermined period; and override the second instruction upon the issuance of the command within the predetermined period to keep the hydraulic pump activated for actuating the one or more sub-systems.

10. The system of claim 7, wherein, the work machine is a battery operated work machine, and prior to raising the instruction, the hydraulic pump is in a deactivated state, the controller configured to:

shift the hydraulic pump to an activated state in response to the instruction.

11. The system of claim 7, wherein, the input device includes a braking system configured to be moved between an engaged state and a disengaged state, in the engaged state, the work machine is retained in a stationary state, and in the disengaged state, the work machine is released from the stationary state to be in a mobile state, the controller configured to:

detect the disengaged state of the braking system in succession to the engaged state of the braking system as a third signal of the one or more signals to determine the condition.

12. The system of claim 7, wherein, the input device includes an operator joystick having an input interface, the input interface configured to be switched between an on-position and an off-position, in the on-position, a movement of the work machine upon a manipulation of the operator joystick is enabled and a fourth signal of the one or more signals is generated by the input device, and in the off-position, the movement of the work machine upon the manipulation of the operator joystick is disabled, the controller configured to:

detect the fourth signal or the on-position of the input interface in succession to the off-position of the input interface to determine the condition.

13. A first work machine, comprising:

one or more sub-systems to perform work;

a hydraulic system to actuate the one or more sub-systems, the hydraulic system including a hydraulic pump; and a system for operating the one or more sub-systems, the system including:

an input device configured to generate one or more signals, the input device including a sensor configured to:

sense a first distance and a second distance of the second work machine with respect to the first work machine; and generate a first signal and a second signal of the one or more signals, wherein the second distance is sensed pursuant to a sensing of the first distance; and a controller communicatively coupled with the input device, the controller configured to:

compare the second signal with the first signal to determine a difference between the second distance and the first distance to have increased beyond a threshold difference to determine a condition;

determine the condition based on the one or more signals, the condition indicating an impending issuance of a command for actuating the one or more sub-systems using the hydraulic system; and raise an instruction to activate the hydraulic pump by powering on an electric motor of the hydraulic system in response to the condition such that the hydraulic system is energized prior to actuating the one or more sub-systems.

14. The work machine of claim 13, wherein the instruction is a first instruction, the controller configured to:

raise a second instruction in pursuance to the first instruction to deactivate the hydraulic pump after a lapse of a predetermined period starting from the raising of the first instruction and upon a non-issuance of the command within the predetermined period; or detect an issuance of the command within the predetermined period and override the second instruction upon the issuance of the command within the predetermined period to keep the hydraulic pump activated for actuating the one or more sub-systems.

15. The work machine of claim 13, wherein, the work machine is a battery operated work machine, and prior to raising the instruction, the hydraulic pump is in a deactivated state, the controller configured to:

shift the hydraulic pump to an activated state in response to the instruction.

16. The work machine of claim 13, wherein, the input device includes a braking system configured to be moved between an engaged state and a disengaged state, in the engaged state, the work machine is retained in a stationary state, and in the disengaged state, the work machine is released from the stationary state to be in a mobile state, the controller configured to:

detect the disengaged state of the braking system in succession to the engaged state of the braking system as a third signal of the one or more signals to determine the condition.

17. The work machine of claim 13, wherein, the input device includes an operator joystick having an input interface, the input interface configured to be switched between an on-position and an off-position, in the on-position, a movement of the work machine upon a manipulation of the operator joystick is enabled and a fourth signal of the one or more signals is generated by the input device, and in the off-position, the movement of the work machine upon the manipulation of the operator joystick is disabled, the controller configured to:

detect the fourth signal or the on-position of the input interface in succession to the off-position of the input interface to determine the condition.

* * * * *